United States Patent

Wieszt

Patent Number: 5,560,213
Date of Patent: Oct. 1, 1996

[54] PROCESS FOR MONITORING THE REFRIGERANT FILL-LEVEL IN A REFRIGERATION SYSTEM

[75] Inventor: Herbert Wieszt, Grafenau, Germany

[73] Assignee: Mercedes-Benz AG, Stuttgart, Germany

[21] Appl. No.: 375,412

[22] Filed: Jan. 18, 1995

[30] Foreign Application Priority Data

Jan. 19, 1994 [DE] Germany .......................... 44 01 415.5

[51] Int. Cl.[6] ................................................... F25B 49/02
[52] U.S. Cl. ............................................... 62/125; 62/129
[58] Field of Search .............................. 62/129, 126, 125, 62/127, 208, 209, 158, 157, 231, 133

[56] References Cited

U.S. PATENT DOCUMENTS

| | | | |
|---|---|---|---|
| 4,167,858 | 9/1979 | Kojima et al. | 62/126 |
| 4,220,010 | 9/1980 | Mueller et al. | 62/209 X |
| 4,677,830 | 7/1987 | Sumikawa et al. | 62/126 |
| 4,745,765 | 5/1988 | Pettitt | 62/129 |
| 5,009,074 | 4/1991 | Goubeaux et al. | 62/126 X |
| 5,079,930 | 1/1992 | Beaverson et al. | 62/129 |
| 5,150,584 | 9/1992 | Tomasov et al. | 62/126 X |
| 5,152,152 | 10/1992 | Brickner et al. | 62/126 |
| 5,186,014 | 2/1993 | Runk | 62/129 |
| 5,239,865 | 8/1993 | Salzer et al. | 62/129 X |
| 5,251,453 | 10/1993 | Stanke et al. | 62/126 |
| 5,285,648 | 2/1994 | Bessler | 62/129 |
| 5,398,516 | 3/1995 | Kuribara et al. | 62/129 |

FOREIGN PATENT DOCUMENTS

| | | |
|---|---|---|
| 4124363 | 1/1993 | Germany . |
| 2-195164 | 8/1990 | Japan . |
| 2258047 | 1/1993 | United Kingdom . |

OTHER PUBLICATIONS

Japanese Patent Abstract No. 55–148611, vol. 5, No. 18 (M–053), Feb. 3, 1981.

*Primary Examiner*—Harry B. Tanner
*Attorney, Agent, or Firm*—Evenson, McKeown, Edwards & Lenahan, P.L.L.C.

[57] ABSTRACT

A process for a refrigeration system having a compressor which divides the refrigerant circuit into a high-pressure side and a low-pressure side measures on the high-pressure side the relative pressure and the temperature at time intervals. Whereupon, using the measured pressure, and on the basis of a refrigerant-specific function, an assigned temperature is determined. By subtracting the measured from the assigned temperature, a supercooling value is determined. The value can be analyzed as a measure of the refrigerant fill-level. At least during an operating phase which is greater than zero, which operating phase is defined by pre-defined operating conditions, for the evaluation of the refrigerant fill-level, a maximum value is used. The maximum value is set at the start of this operating phase to the last determined supercooling value and, in the course of this operating phase, respectively to a newly determined supercooling value in which at the respective instant, the supercooling value is greater than the previous maximum value. This enables the fill-level to be reliably monitored, including for refrigeration systems having a regulated compressor.

8 Claims, 2 Drawing Sheets

PROCESS FOR MONITORING THE REFRIGERANT FILL-LEVEL IN A REFRIGERATION SYSTEM

BACKGROUND AND SUMMARY OF THE INVENTION

The invention relates to a process for monitoring the refrigerant fill-level in a refrigeration system and, in particular, to a refrigeration system in a motor vehicle. The refrigeration system includes a compressor which divides a refrigerant circuit into a high-pressure side and a low-pressure side.

A process of this type is known from German Patent document DE 41 24 363 A1. The fill-level is herein monitored on the principle of supercooling calculation. From the measured pressure value, the vapor-pressure temperature is determined a vapor-pressure curve of the refrigerant which is used. By obtaining the difference between the vapor-pressure temperature and the measured refrigerant temperature, the supercooling value is calculated. It was herein recognized that this supercooling value is a measure of the quantity of refrigerant present.

It is important in this procedure to bear in mind that the supercooling value, apart from the quantity of refrigerant present, is additionally dependent upon the outside temperature, upon the efficiency and ventilation, i.e. cooling, of a condenser located within the refrigeration system, upon the compressor rotation speed, and upon the type of compressor, i.e., a regulated or unregulated compressor. The known method definitely provides a reliable indication of the refrigerant fill-level for refrigeration systems having an unregulated compressor, since in this case all of the influencing variables are able to be sufficiently accurately recorded. Unregulated compressors of this type, which run either at full capacity or are cut out, operate on a synchronized basis. Where such a compressor is running and the system is in a steady state, indicative supercooling values are able to be determined provided that the condenser is evenly ventilated, i.e. where the travelling speed is constant. The outside temperature and the compressor rotation speed here have only a small influence upon the determined supercooling value, whereas contaminations of the refrigerant, e.g. an excessive proportion of foreign gas or moisture, have a large effect. This can be taken into account by using a correspondingly suitable vapor-pressure curve when calculating the supercooling. By measuring each or some of the variables for refrigeration systems having an unregulated compressor, such as the outside temperature, travelling speed, compressor operating state, operating state of any condenser booster fan and evaporator temperature, time domains can consequently be determined. In the time domains, the computed supercooling value can be used as a reliable measure of the refrigerant fill-level. The size of any remaining disturbance influences likewise is determinable and is able to be taken correspondingly into account when analyzing the supercooling.

In the known process, in order to monitor the fill-level, it is consequently envisioned to determine the supercooling value at time intervals until such time as a quasi-stable state for this value is recognized. Each of, or a part of, the supercooling values for the analysis are used without any reciprocal comparison of the supercooling values for fill-level control purposes.

Where a regulated compressor is used, the delivered quantity of refrigerant can be altered in multiple steps or by a continuous adjustment. The known calculation of the supercooling value provides, in this case, no direct pointer to the refrigerant fill-volume. Although there is the possibility of keeping such a compressor forcibly switched off for a sufficiently long time period, so that, when switched back on, it will certainly operate at full capacity, thereby providing reliable delivery-rate information for this operating phase, this procedure has a comfort-reducing effect because of the necessary compressor down-time.

There is therefore needed a process of the above-mentioned type by which the refrigerant fill-level can be monitored comfortably and reliably, by determining the supercooling value, even for refrigeration systems having a regulated compressor.

These needs are met according to the present invention by a process for monitoring the refrigerant fill-level in a motor vehicle refrigeration system having a compressor which divides a refrigerant circuit into a high-pressure side and a low pressure side. At time intervals, the relative pressure and temperature are measured on the high-pressure side. Using the measured pressure, on the basis of a refrigerant-specific function, an assigned temperature is determined. By subtracting the measured from the assigned temperature, a refrigerant-supercooling value is determined. This value can be analyzed as a measure of the refrigerant fill-level. At least during predefinable operating phases of the refrigeration system a maximum value is used for the evaluation of the refrigerant fill-level. The maximum value is set at the start of this operating phase to the last determined supercooling value and in the course of this operating phase to a respectively newly determined supercooling value which is greater than the maximum value obtained at the corresponding instant.

Underlying the present invention is the recognition that the supercooling value constantly declines and does not increase, on the one hand, as the quantity of refrigerant falls, but also, on the other hand, when disturbance variables encroach into the system and/or the regulated compressor delivers a quantity of refrigerant which is less than the maximum possible. Consequently, a supercooling value which is indicative of the fill-level is always obtained whenever the regulated compressor delivers at full capacity and no disturbance variables encroach. It is not however necessary to define this instant. For, if otherwise predetermined operating conditions are obtained, the influence of which is known, then the delivery of a smaller quantity of refrigerant by the regulated compressor and/or the encroachment of disturbance variables into the system during an operating phase of this type results, at most, in a drop in the supercooling values which are continually calculated during this operating phase. For this reason, a reliable fill-level indication in such an operating phase is made possible by the fact that a respective maximum value is used for evaluating the fill-level from the calculated supercooling values since this value is representative of the fill-level.

A further embodiment of the invention for a motor vehicle air-conditioning system has the advantage that, when the vehicle is stationary, the supercooling value which is instantaneously determined is simultaneously used immediately, in each case, as a measure of the refrigerant fill-level. This is desirable, in particular, for servicing works. This normally constitutes a usable fill-level indication, even without the creation of a maximum value. This is because when the vehicle is stationary, i.e. the travelling speed is equal to zero, the condenser of the air-conditioning system is only slightly ventilated and the efficiency of the system is consequently poorer, for which reason the regulated compressor, is highly likely to operate at full capacity.

A further embodiment of the invention has the advantage that even a gradual loss of refrigerant and the, where appropriate, resulting drop in fill-level below a predefined threshold value, is thereby discernable. For if a maximum value, which has been forcibly successively decremented in this manner, is used for monitoring the fill-level, then, if the fill-level remains constant, this maximum value is automatically increased again from time to time by a recorded higher supercooling value. If, in the further course of operation, no such automatic increase comes about, then this is consequently an indication that the fill-level has diminished during this operating phase.

Preferably, an underfill warning signal and/or a cutting-out of the refrigeration system is envisioned where the maximum value, used to evaluate the refrigerant fill-level, for a threshold time period which in each case is suitably pre-chosen remains less than a respectively suitably pre-chosen threshold value. The threshold time periods and threshold values for the warning signal and cut-out can herein be chosen to be equal or varied in size, a favorable realization consisting in providing equal-sized threshold time periods and, for the warning signal, a larger threshold value than for the cut-out. This is so that the warning signal is definitely effected prior to the cut-out of the refrigeration system. Expediently, the possibility is provided of halting the progression of the respective threshold time period for as long as the compressor is switched off or the vehicle is stationary, and to reset it whenever the vehicle is parked or the maximum value again exceeds the corresponding threshold value so as then to be able to start afresh the progression of the threshold time period.

Other objects, advantages and novel features of the present invention will become apparent from the following detailed description of the invention when considered in conjunction with the accompanying drawings.

DETAILED DESCRIPTION OF THE DRAWINGS

The motor vehicle air-conditioning system upon which the process is based possesses a conventional structure containing a regulated compressor. A compressor of this kind is operated not on a synchronized but on a continuous basis and matches the delivered quantity of refrigerant, by reducing the piston stroke in the compressor, to the respective refrigeration requirement. This operation thereby prevents switch-on shocks which occur in synchronized, unregulated compressors. However, information used in the conventional calculation of the supercooling value which relates to the size of the refrigerant throughput at a given instant when the compressor is active, is lost by operating the compressor on a continuous basis.

The process according to the invention described in greater detail below enables this instant of maximum delivery rate to be indirectly determined and, consequently, a reliable conclusion to be drawn concerning the refrigerant fill-level. This is based upon the recognition that the supercooling value which is in each case determined respectively decreases both as the quantity of refrigerant drops and as the compressor output diminishes and disturbance variables appear in the system. The outcome of this is that, in order to determine a supercooling value which can be used to evaluate the fill-level, the explicit determination of an instant in which compressor output is at a maximum is not necessary. For periods of this type can also be recognized by the fact that the corresponding supercooling values, under otherwise constant conditions, are at a maximum.

Figure 1:
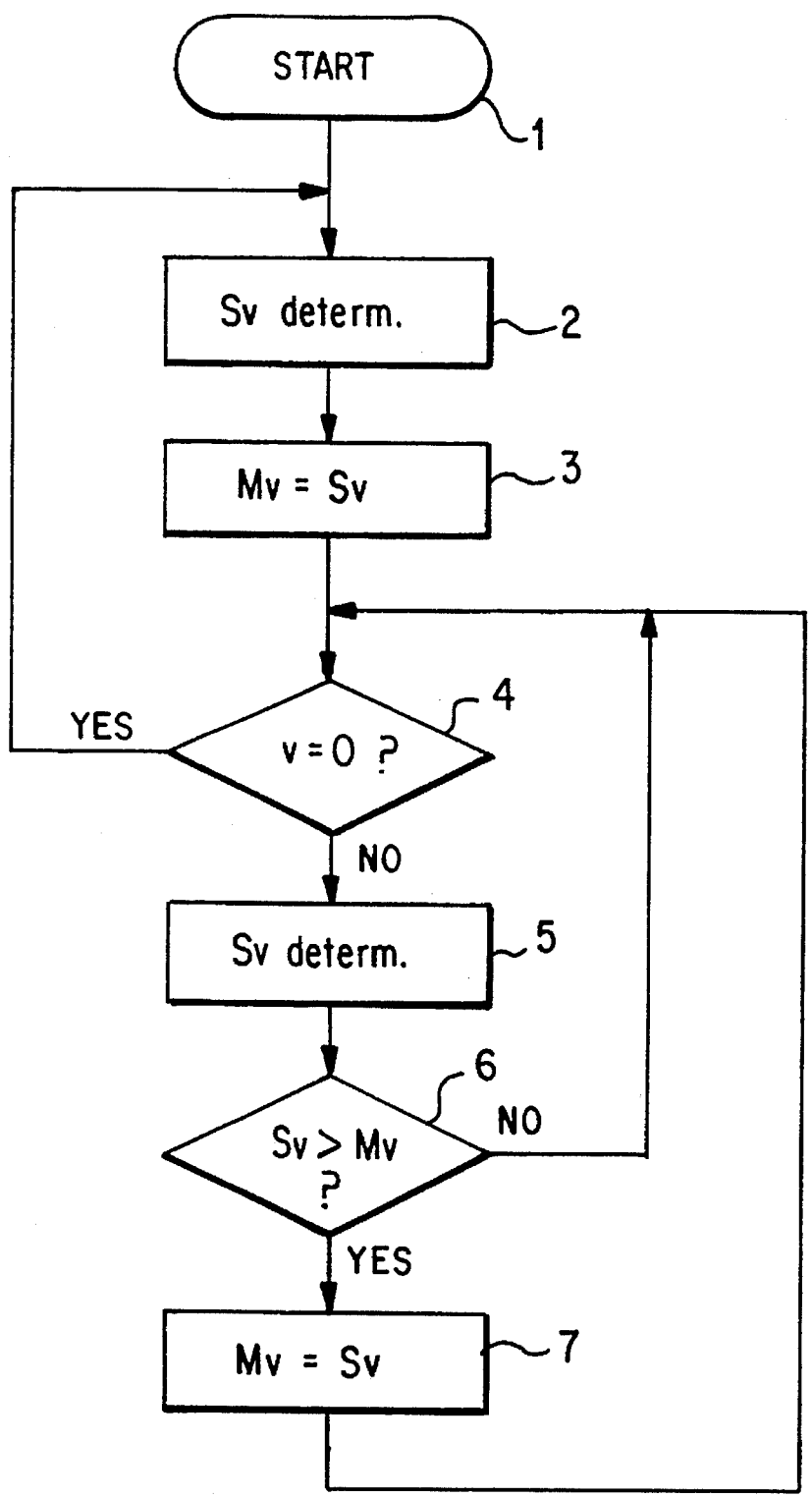
FIG. 1 is a program flow chart of a section of a process for monitoring the refrigerant fill-level in a motor vehicle air-conditioning system according to the invention.

For evaluating the refrigerant fill-level, the process makes: use of a maximum value which is derived from supercooling values determined at time intervals according to a procedure illustrated in FIG. 1. Only when the vehicle is stationary is the respectively last determined supercooling value used directly to evaluate the fill-level, i.e. analyzed. The process is stored as a program in an air-conditioning control unit of the air-conditioning system.

Figure 2:
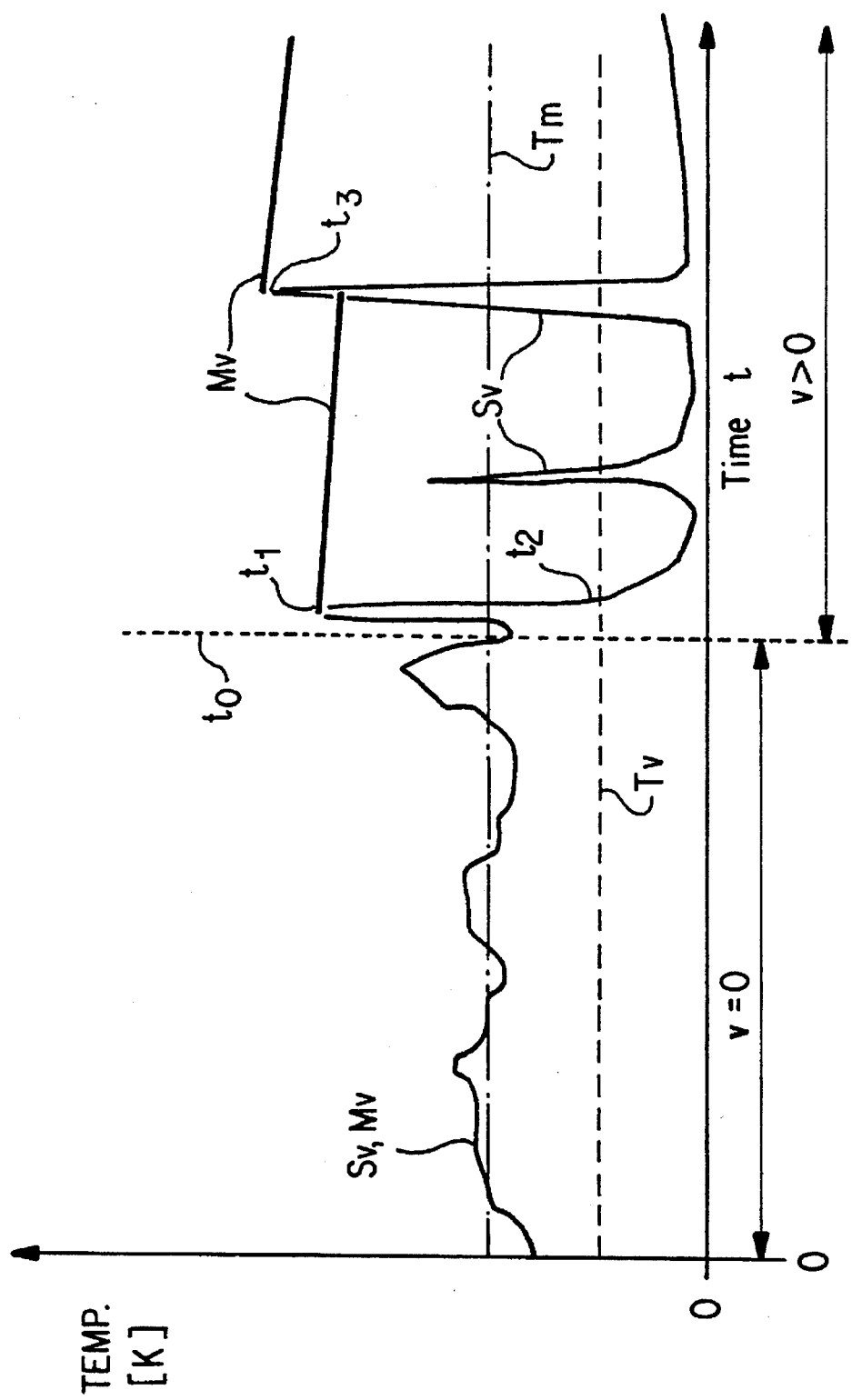
FIG. 2 is a diagram exhibiting a typical time pattern of supercooling values determined according to the process and maximum values derived therefrom for evaluating the fill-level.

In greater detail, the procedure is described as follows. When the air-conditioning system is activated, the relative pressure and temperature are continually measured in a conventional manner at predefined time intervals, respectively, on the high-pressure side of the system. Whereupon, using the measured pressure and on the basis of a refrigerant-specific function, an assigned temperature is determined. By subtraction of the measured from the assigned temperature, an associated supercooling value (Sv) of the refrigerant is computed. A typical function pattern (Sv(t)) of the refrigerant supercooling value (Sv) as a function of time (t) is represented in FIG. 2. For a first time segment between $t=0$ and $t=t_0$, an operating phase is obtained in which the vehicle is stationary, i.e. the vehicle speed (v) is equal to zero, and for a following time segment t greater than $t_0$, a second operating phase is obtained in which the vehicle speed (v) is greater than zero.

From these successively calculated supercooling values (Sv), a maximum value (Mv) for each instant is determined in a manner apparent from FIG. 1 and described in detail below. Once the maximum value determination (step 1) has been activated, for example upon starting of the vehicle at the instant $t=0$, a first supercooling value (Sv) is initially determined (step 2). The maximum value (Mv) is hereupon set to the initial value of this first determined supercooling value (Sv) (step 3). An interrogation is then conducted (step 4) to establish whether an operating phase is obtained in which the vehicle speed (v) is equal to zero. If this is the case, then the maximum value (Mv) remains unaltered and the process sequence returns to before (step 2) for the renewed determination of a supercooling value (Sv). In the operating phase in which the vehicle is stationary (v=0), as is indicated in FIG. 2 for this period, the time pattern for the maximum value (Mv) corresponds therefore to that for the supercooling value (Sv), since both values are at each instant identical. If it is recognized, on the other hand, that a vehicle speed (v) which is not equal to zero and consequently an operating phase in which the vehicle is rolling is determined, then the next supercooling value (Sv) is hereupon likewise first determined. Then, in step 6, an interrogation examines whether the supercooling value (Sv) which has just been determined is greater than the maximum value (Mv) which has previously been obtained. If this is the case, then the maximum value (Mv) is set to this higher supercooling value (Sv) (step 7). After this, a return is made to before the interrogation step (4) concerning the vehicle speed and the subsequent process section is repeated. The same applies where it is established in the interrogation step (6) that the supercooling value (Sv) which has just been determined is not greater than the previous maximum value (Mv), in which case a return is made, without changing the maximum value (Mv), to the interrogation step (4) concerning the vehicle speed.

In addition, in the section of the process for the operating phases in which the vehicle is rolling, i.e. the vehicle speed (v) is not equal to zero, a reduction algorithm (not shown) for the respectively obtained maximum value (Mv) is provided for the purpose of recognizing a gradual loss of refrigerant. The maximum value (Mv) during the operating phases in which the vehicle speed is not equal to zero is herein continually reduced, parallel to the algorithm shown in FIG. 1, at a freely optional rate which is predominantly set at 0.1K per 18 seconds, i.e., 20K per hour, although any other value in the range between about 10K/h and 20K/h is also alternatively possible. The possible raising of the maximum value (Mv) as a result of a recognized higher supercooling value (Sv) in step (7) of FIG. 1 remains thereby unaffected, i.e., this raising takes place, whereafter, in place of the previous one, the new, raised maximum value (Mv) is then continually reduced.

This explains the time pattern of the maximum value (Mv), which time pattern is shown in FIG. 2, for the operating phase in which the vehicle is rolling, i.e. the interval in which the vehicle speed (v) is greater than zero. At the instant $t=t_0$, the start of this operating phase is herein recognized by the interrogation step (4) of FIG. 1, the maximum value (Mv) initially remaining set at the supercooling value (Sv) last determined in the preceding operating phase in which the vehicle was stationary (v=0). The determination of the supercooling value at the instant ($t_1$) then produces a relatively increased supercooling value (Sv), this being recognized by the interrogation step (6) of FIG. 1, whereafter the maximum value (Mv) is now raised to this increased value. From this value at the instant ($t_1$), the maximum value (Mv) is continually reduced slightly, in the specified manner, by the above-described reduction algorithm. The corresponding time pattern (Mv(t)) for a period following the instant ($t_1$) thus produces a straight line exhibiting a small gradient. The supercooling values (Sv) which are further continually determined in this period up to a later instant ($t_3$) do not at any instant within this period exceed the maximum value (Mv) determined in this manner, so that the latter value undergoes no increase in value. At the instant ($t_3$), on the other hand, the supercooling value (Sv($t_3$)) which is determined there exceeds the maximum value (Mv) obtained at this instant, so that the maximum value (Mv) is raised, according to step (7) of FIG. 1, to this higher value. From this newly set, increased value, the maximum value (Mv) then falls again on the basis of the gradual reduction at the preferably chosen rate of 0.1K per 18 seconds.

The maximum value (Mv) determined in the above-described manner is used in place of the previously conventional direct usage of the respectively instantaneous supercooling value (Sv) to evaluate the refrigerant fill-level. Even in the operating phase in which the vehicle is stationary, i.e., the vehicle speed (v) is equal to zero, the maximum value (Mv) which in each case is instantaneously obtained is used for the analysis in respect to the fill-level. Since, in this operating phase, the maximum value (Mv) is respectively identical to the supercooling value (Sv), there is to this extent no fundamental change, within the framework of this operating phase, relative to the hitherto conventional process. Nor is there any need for such change, since, when the vehicle is stationary, the condenser of the air-conditioning system is only slightly ventilated and a comparatively poor system efficiency is therefore obtained. This fact makes it very likely that the activated regulated compressor operates in any event close to its maximum output, so that, when the vehicle is stationary, a broadly reliable indication of the fill-level can be derived at any instant from the respective instantaneous supercooling value. In this operating phase in which the vehicle is stationary, no cut-out of the compressor is undertaken, even if the supercooling value (Sv) falls for a lengthy period below a predefined threshold value. Rather, the respectively computed supercooling value (Sv) is freely displayed and utilized, for example, for servicing works.

At the instant ($t_0$), according to FIG. 2, the vehicle is moved and the operating phase commences in which the vehicle speed (v) is greater than zero. In this operating phase, the fill-level is checked on the basis of the instantaneous maximum value (Mv) determined in the manner described above and not on the basis of the instantaneous supercooling value (Sv), which is generally different therefrom.

The analysis is herein realized as follows. Whenever the maximum value (Mv) falls below a warning threshold value (Tm), which is presently chosen by way of example only and not restrictively to be 4K, as marked by the dash-dot line in FIG. 2, for the duration of a threshold time length set at 10 minutes, an underfill warning signal is given to the driver as an early warning of an excessively low refrigerant fill-level. If the maximum value (Mv) for a threshold time length, which is likewise set at 10 minutes, falls below a further, lower threshold value (Tv), which by way of example but not restrictively measures 2K as marked in FIG. 2 by the dashed line, then the refrigeration system is cut out. The progress of the threshold time length is determined by corresponding time meters for the early warning or cut-out, which are respectively switched on whenever the current maximum value (Mv) falls below the associated threshold value. The respective meter and hence the progress of the associated threshold time length is halted whenever the compressor is switched off or the vehicle comes to a standstill. As soon as the compressor is switched on again or the vehicle is rolling again, the respective meter runs on again. If the maximum value (Mv) again exceeds one of the threshold values (Tm, Tv) after having previously fallen below it, the corresponding meter is reset to the original value so as to be ready for a new time-length metering. The same resetting is also carried out whenever the ignition of the motor vehicle is switched off.

During the operating phase represented in FIG. 2 in which the vehicle is rolling, the maximum value (Mv) discernably lies constantly above the two threshold values (Tm, Tv), so that, in the period shown there, no early warning or cut-off of the air-conditioning system due to excessively low refrigerant fill-level is effected. On the contrary, the refrigerant fill-level is sufficient. Although, in this period, the instantaneously determined supercooling value (Sv) falls below the two threshold values (Tm, Tv) on several occasions, this is attributable to a respective reduction in the output of the regulated compressor. Thus at the instant ($t_2$), for example, the supercooling value (Sv) falls below the cut-out threshold value. (Tv) of preferably 2K for the first time during the operating phase in which the vehicle speed (v) is greater than zero and then it even approaches the value 0K. As already stated, this is attributable however to the reduced compressor output and not to a drop in refrigerant fill-level. This is taken into account by the fill-level evaluation based on the maximum value (Mv) determined in the above-described manner. The maximum value essentially represents the instants in which the compressor output is at a maximum. This maximum value (Mv) does not therefore shadow the reduction in supercooling value (Sv) due to reduced compressor output and thus constitutes an indicative value for the monitoring of the fill-level. Where, in further operation in which the vehicle speed (v) is not equal to zero, a gradual loss of refrigerant occurs, then this initially results in the instantaneous supercooling value (Sv), even at maximum compressor output, no longer rising above the threshold values (Tm, Tv). Consequently, the maximum value (Mv) drops due to the gradual value reduction of preferably 0.1K per 18 seconds which has been undertaken, the result of which is that eventually even this maximum value (Mv) drops initially below the warning threshold value (Tm) and finally also, where appropriate, below the cut-out threshold value (Tv) and thereby generates an early warning or cut-out. If, on the other hand, no loss of refrigerant occurs, then at certain operating intervals the compressor will in each case run at least briefly at maximum output, whereby the instantaneous supercooling value (Sv), at least for a short period, increases strongly again. This can be seen, for example, in the case shown at the instant ($t_3$) in FIG. 2, whereby the slowly falling maximum value (Mv) is raised again to a higher value, so that no underfill warning or compressor cut-out is effected.

It should at this point be stated that in the operating phase in which the vehicle speed (v) is equal to zero, an early warning or compressor cut-out is suppressed, even if, in this period, the instantaneous supercooling value (Sv), and hence also the maximum value (Mv), falls below corresponding threshold values, such as the warning threshold value (Tin) in the case of FIG. 2.

The present process allows, furthermore, a warning and cut-out facility (not explicitly illustrated in the figures) where the refrigerant fill-level is excessively high, to which end corresponding upper threshold values are predefined and a warning or cut-out is then effected whenever the maximum value (Mv) exceeds the threshold value in question for the pre-chosen period.

The above-described process performs a reliable monitoring of the refrigerant fill-level of the vehicle air-conditioning system despite the use a regulated compressor. For one skilled in the art, of course, modifications to the above embodiment, within the framework of the invention, are possible. Thus, for example, the fill-level control can be applied where necessary to all operating phases and not only, as in the above example, to those operating phases in which the vehicle speed is not equal to zero, where, for example, no free supercooling value display is required for servicing works. It is additionally obvious that the parameters of the process, such as the threshold period, threshold values and reduction rate pertaining to the gradual reduction in maximum value can be set to other values than those specified above, such that they are matched in a system-dependent manner.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for monitoring a refrigerant fill-level in a refrigeration system of a motor vehicle air-conditioning system having a compressor dividing a refrigerant circuit into a high-pressure side and a low-pressure side, the process comprising the steps of:

measuring a relative pressure and temperature on the high-pressure side of the refrigerant circuit at predetermined time intervals;

determining an assigned temperature using the measured relative pressure on a basis of a refrigerant-specific function;

determining a refrigerant-supercooling value by subtracting the measured temperature from the assigned temperature, said refrigerant-supercooling value being analyzed as a measure of the refrigerant fill-level;

using a maximum value, at least during predefined operating phases of the refrigeration system, for evaluating the refrigerant fill-level, said maximum value being set at a start of one of said predefined operating phases to a last determined refrigerant-supercooling value;

reducing the maximum value during said predefined operating phases which have an operating condition wherein a vehicle speed is not equal to zero; and setting the maximum value during the course of said one predetermined operating phase to a newly determined refrigerant-supercooling value when said newly determined refrigerant-supercooling value is greater than the maximum value currently being used.

2. A process according to claim 1 for a motor vehicle air-conditioning system, further comprising for the evaluation of the refrigerant fill-level the steps of:

during operating phases defined by an operating condition wherein a vehicle speed is equal to zero, using the respectively last determined supercooling value; and during operating phases defined by an operating condition wherein a vehicle speed is not equal to zero, using a maximum value which is set at the start of this operating phase to the supercooling value last determined in the preceding operating phase in which the vehicle speed is equal to zero, and in the course of this operating phase, to a respectively newly determined supercooling value which is greater than the maximum value obtained at the corresponding instant.

3. A process according to claim 2, further comprising the step of decrementing the respective maximum value at pre-chosen time intervals by a pre-chosen amount.

4. A process according to claim 2, further comprising the steps of effecting an underfill warning signal and/or a cut-out of the refrigeration system whenever an operating phase occurs in which the maximum value is used as a measure of the refrigerant fill-level and the maximum value for a pre-chosen warning or cut-out threshold time period remains less than a pre-chosen warning or cut-out threshold value.

5. A process according to claim 1, further comprising the step of decrementing the respective maximum value at pre-chosen time intervals by a pre-chosen amount.

6. A process according to claim 5, further comprising the steps of effecting an underfill warning signal and/or a cut-out of the refrigeration system whenever an operating phase occurs in which the maximum value is used as a measure of the refrigerant fill-level and the maximum value for a pre-chosen warning or cut-out threshold time period remains less than a pre-chosen warning or cut-out threshold value.

7. A process according to claim 1, further comprising the steps of effecting an underfill warning signal and/or a cut-out of the refrigeration system whenever an operating phase occurs in which the maximum value is used as a measure of the refrigerant fill-level and the maximum value for a pre-chosen warning or cut-out threshold time period remains less than a pre-chosen warning or cut-out threshold value.

8. A process according to claim 7, wherein the step of effecting further comprises the steps of:

halting a progress of the warning or cut-out threshold time period for as long as the compressor is switched off or the vehicle speed is equal to zero; and resetting the warning or cut-out threshold time period whenever the maximum value exceeds the corresponding threshold value or an ignition is cut-out.

* * * * *